Sept. 6, 1927.                                                        1,641,358
                        C. N. SMYSER
                   REFRESHMENT SERVING RACK
                      Filed May 17, 1924
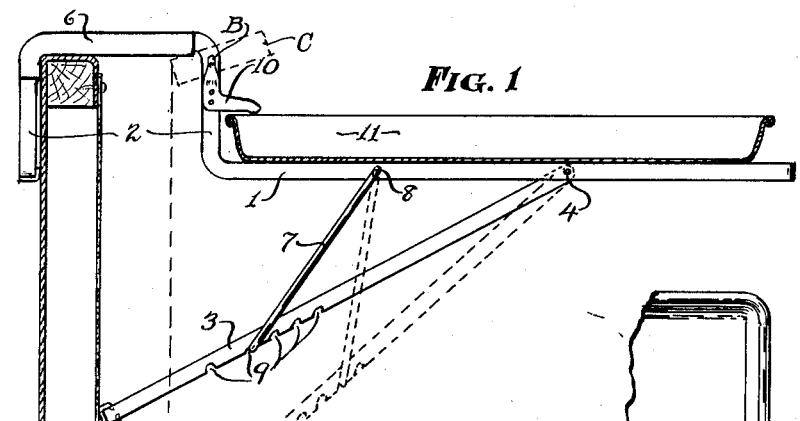
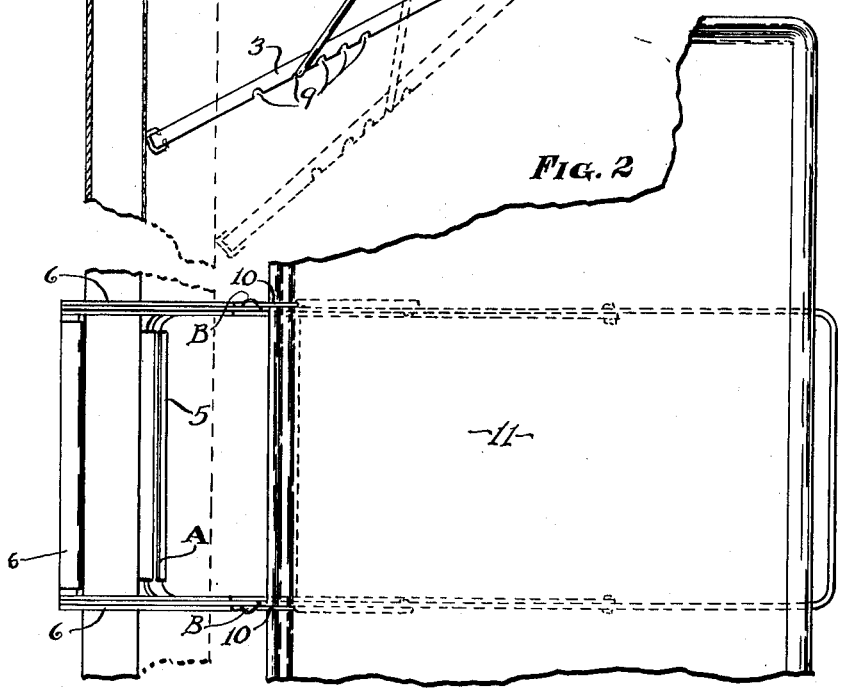
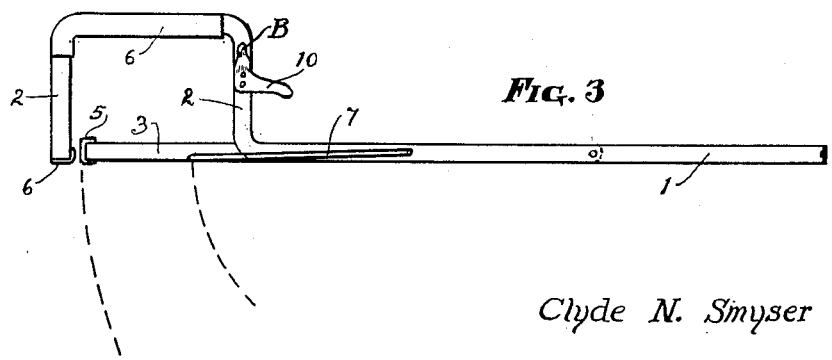
Inventor
Clyde N. Smyser
Attorney Patented Sept. 6, 1927.

1,641,358

UNITED STATES PATENT OFFICE.

CLYDE N. SMYSER, OF WICHITA, KANSAS.

REFRESHMENT-SERVING RACK.

Application filed May 17, 1924. Serial No. 714,089.

My invention relates to a rack for supporting a refreshment tray or other articles.

The object of my invention is to provide a rack that can be attached to the side of a vehicle, for the purpose of serving refreshments.

A further object of my invention is to provide a rack that will fold, for convenience of carrying.

A still further object of my invention is to provide a rack that is adjustable, to meet various conditions.

Referring to the drawings, Fig. 1 is a side view of the rack, attached to an automobile door, and a tray in position.

Fig. 2 is a top view of Fig. 1.

Fig. 3 is a side view of the device when folded.

1 is the supporting member, having a rectangular hook as at 2, said hook functions as means for attaching said member to the door of an automobile or other means of support. 3 is a brace member, being pivotally attached as at 4, so that the said member may close as shown in Fig. 3 or adjust to varying thickness of doors, as shown by dotted lines, as shown in Fig. 3, or adjust to varying thickness of doors, as shown by dotted lines, as shown in Fig. 1. The said brace being pivotally attached to each side of the supporting member 1, and bending to a rectangular form, and at the contacting end, I have placed a rubber tubing 5, said tubing may be slid over said member longitudinally, or may be split as shown at A, in Fig. 2, by which means the flexible tubing may be applied, when it is necessary to be replaced, when worn or soiled. The object of said tubing is to prevent the brace member 3 from marring the finished surface of the body to which it is attached. I have also provided a tubing 6 to cover the hook of the supporting member 1, which functions to the purpose as above described. 7 is a bail pivotally connected to supporting frame at 8, and the said bale functions as a tie and is adapted to engage in notches 9, said notches being distributed along the lower side of the brace member 3, so that said member may be angled to maintain a level position of the support 1. The said members 7 and 3 are adapted to fold in parallel alignment with support 1, as shown in Fig. 3 for convenience of storage, transportation or practical daily use in carrying about. On the hook member 2 is firmly attached a safety catch 10, one being on each side of said support, the object of which is to place the edge of the tray 11 so that it will engage, preventing said tray from tipping, should the contents be unequal, and also as a simple means for withdrawing the tray when returning the mechanism to the store.

I do not confine myself to any particular size or use thereof, as it may be convenient to display goods, having a suitable place to attach, and such other modifications may be employed or uses adapted as lies within the scope of the appended claim.

Having thus described my invention, what I claim as new and desire to secure by Letters Patent is:

In a refreshment serving tray, a rectangular frame, the ends of which form a rectangular hook extending above the plane of the frame so that the tray will be supported below the top edge of the door to which it is attached, rubber tubing on the said hook, safety catches and ticket clamping means combined, positioned on the right angle bend adjacent to the tray supporting frame, the said safety catches functioning as a stop engaging over the edge of the tray, preventing said tray from tilting, a U shaped brace and a U shaped bail pivoted to the rectangular frame so that the folding thereof will position them in alignment with the said rectangular frame, a rubber tubing on the end of said brace engaging on the plane of the door, all for the purpose described.

CLYDE N. SMYSER.